United States Patent [19]
Chaudet et al.

[11] Patent Number: 5,771,082
[45] Date of Patent: Jun. 23, 1998

[54] ACTIVE MATRIX DISPLAY UTILIZING AN EMBEDDED GROUND PLANE

[75] Inventors: René Chaudet, Grenoble; Jean-Michel Vignolle, Bourg la Reine, both of France

[73] Assignee: Thomson-LCD, Paris, France

[21] Appl. No.: 762,693

[22] Filed: Dec. 12, 1996

Related U.S. Application Data

[63] Continuation of Ser. No. 325,478, Oct. 19, 1994, abandoned, which is a continuation of Ser. No. 211,445, Apr. 11, 1994, abandoned.

[30] Foreign Application Priority Data

Oct. 11, 1991 [FR] France .................................. 91 12585

[51] Int. Cl.⁶ ........................... G02F 1/1333; G02F 1/136
[52] U.S. Cl. ............................... 349/39; 349/111; 349/42
[58] Field of Search .................................. 349/38, 39, 42, 349/110, 111

[56] References Cited

U.S. PATENT DOCUMENTS

| | | | |
|---|---|---|---|
| 4,431,271 | 2/1984 | Okuob | 359/59 |
| 4,881,797 | 11/1989 | Aokc | 359/67 |
| 5,091,792 | 2/1992 | Kaida | 359/67 |
| 5,191,452 | 3/1993 | Sarma | 359/59 |
| 5,251,049 | 10/1993 | Sato | 359/67 |
| 5,339,181 | 8/1994 | Kim | 359/59 |
| 5,459,596 | 10/1995 | Ueda | 359/59 |

FOREIGN PATENT DOCUMENTS

| | | | |
|---|---|---|---|
| 271313 | 8/1988 | European Pat. Off. | 359/59 |
| 2262026 | 11/1987 | Japan | 359/59 |
| 2262027 | 11/1987 | Japan | 359/59 |

*Primary Examiner*—William L. Sikes
*Assistant Examiner*—Tiep H. Nguyen
*Attorney, Agent, or Firm*—Oblon, Spivak, McClelland, Maier & Neustadt, P.C.

[57] ABSTRACT

A device for attenuating stray capacitances in a liquid crystal and active matrix screen. The screen includes a substrate plate on one face of which there are deposited electrodes and thin film components controlling the electrodes. It also includes a back plate having one or more back-plate electrodes and covering the face of the substrate plate. A liquid crystal is contained between the electrode of the substrate plate and the back-plate electrodes. A ground plane forms an equipotential over the whole surface of the screen between the substrate plate and the thin films of the control components. The ground plane along with a film of insulating material forms a storage capacitance.

11 Claims, 5 Drawing Sheets

ACTIVE MATRIX DISPLAY UTILIZING AN EMBEDDED GROUND PLANE

This application is a continuation of application Ser. No. 08/325,478, filed on Oct. 19, 1994, now abandoned, which is a continuation of application Ser. No. 08/211,445, filed on Apr. 11, 1994, now abandoned.

BACKGROUND OF THE INVENTION

1. Field of the Invention

The subject of the present invention is a device for attenuation of the stray capacitances present in a liquid crystal and active matrix screen.

2. Discussion of the Background

A liquid crystal screen consists of a number of liquid crystal cells disposed in a matrix lattice. These cells are formed from two support plates, in general made of glass, stuck together by a peripheral seal which makes a cavity with a small thickness (of the order of 10 microns) in which the liquid crystal of the cells is situated. The first support plate consists of a substrate containing a first set of electrodes and in the case of active matrix displays the thin film control components disposed between these electrodes to which they are connected. The second support plate constitutes a back-plate electrode.

Each cell thus formed functions as an optical valve. The local modification of the transmission or of the reflection of light is obtained by externally applying a voltage between an access contact of the plate and a contact of the back plate. This voltage gives rise to an electric field between the opposite electrodes and activates the volume of liquid crystal situated between the two electrodes which modifies to a greater or lesser extent the characteristics of the light which passes through it.

In the rest of the text, the term pixel (short for Picture Element in English) is used to mean the cell forming the elementary image or display point constituted by the electrode, the liquid crystal, the back-plate electrode, the control component and the connections of the component with the peripheral electronics.

The active surface of the pixel is the surface covered by the electrode and the liquid crystal on which the desired electrooptical effects are obtained; this surface may be larger or smaller in area than the effective surface of the electrode because the edge effects around the electrode may either increase or diminish the surface area of the active zone (these variations being of the order of 1 $\mu$m short of or beyond the zone covered by the electrode).

The noncontrolled surface of the pixel is constituted by the whole surface of the pixel outside the active surface previously defined.

The utilisation of transistors as control components allows addressing of the pixels line by line or multiplexing. The transistor acts as a switch between the pixel and the column which conveys the image information (data line) and which corresponds to the drain of the transistors. This switch, controlled by the line (scan line) corresponding to the gates of the transistors, is first closed for the duration of one line scan of the image, in order to put the pixel and the corresponding column in electrical contact. Then this switch is opened when the following line is to be addressed in order to isolate the pixel from the corresponding column, this being in order for the pixel to accurately store the voltage which has been applied to it. This accurate storage is not however perfect: in fact, the pixel is electrically coupled to the neighbouring lines and columns via stray planar capacitances. This signifies that the voltage variations on the neighbouring lines and columns generate variations in the voltage of the pixel. In the case of high definition screens (at least 100 lines per centimeter), these effects become highly distorting and generate visible artefacts: flicker, vertical crosstalk, which impair the quality of the image. These distortions are well known and one means of remedying them is to add a storage capacitance.

Numerous solutions for producing this storage capacitance have been described in the scientific literature.

One simple solution consists in enlarging the pixel electrode so that it covers the adjacent line. The capacitance obtained is however too low to be effective and complicates the control electronics.

Another solution consists in adding on an additional line between each scan line pair, this line passing opposite the pixel electrode and therefore acting solely as a storage capacitance. This structure is widely used because it allows a satisfactory value of the storage capacitance to be obtained and does not require modification in the manufacturing method. This structure however has the drawback of diminishing the opening coefficient of the screen (OAR=Open Aperture Ratio), the additional line being produced with an opaque metal. In order to improve the OAR, it is possible to produce the line with a transparent conducting material, but the currently available materials are too resistive (ITO) and their use leads to additional artefacts (horizontal coupling) which degrades the quality of the image. A third solution consists in adding on not additional lines but additional columns. Type of storage capacitance is described in patent application EP 136509 of Toshiba. This solution allows a satisfactory value of storage capacitance to be obtained, but also diminishes the OAR. In the case of reflexive display mode, U.S. Pat. No. 4,239,346 describes a storage capacitance protecting FET transistor from light. This type of storage capacitance needs a mask level.

SUMMARY OF THE INVENTION

The object of the present invention is to produce a storage capacitance which is much higher than the previously described capacitances, and to do this without diminishing the OAR, while diminishing the stray planar capacitances. It is characterised by the utilisation of a ground plane embedded beneath the thin films constituting the control components and the lines and columns for connecting the liquid crystal screen, and covering the whole of its surface.

This ground plane is deposited on the substrate plate and forms, with a film of insulator, a storage capacitance on which the control components and the connection lines and columns are deposited and etched in thin films. This ground plane, on the one hand, acts as a screen to the field lines of the stray planar capacitance which greatly diminishes and, on the other hand, forms a storage capacitance which, being parallel with the capacitance of the liquid crystal, increases the capacitance of the pixel and thus diminishes the coupling coefficient. This storage capacitance therefore diminishes the variation in the charge of the pixel which is theoretically electrically isolated at the time of the variations in the voltages of the columns or lines adjacent to the electrodes of the pixels and makes the electronics for correcting this defect much simpler.

The present invention is, on the other hand, very simple to produce since it is sufficient to add two relatively easily executable steps at the start of the process for manufacturing the liquid crystal screen.

Another important advantage is that it is possible to integrate with this storage capacitance a device for improving contrast by producing the electrode of this by an opaque mask (or black matrix) deposited directly onto the plate.

BRIEF DESCRIPTION OF THE DRAWINGS

The invention will be better understood and other advantages will emerge on reading the description which is to follow and is given by way of non-limiting example and is accompanied by the attached drawings in which.

DESCRIPTION OF THE PREFERRED EMBODIMENTS

Figure 1:
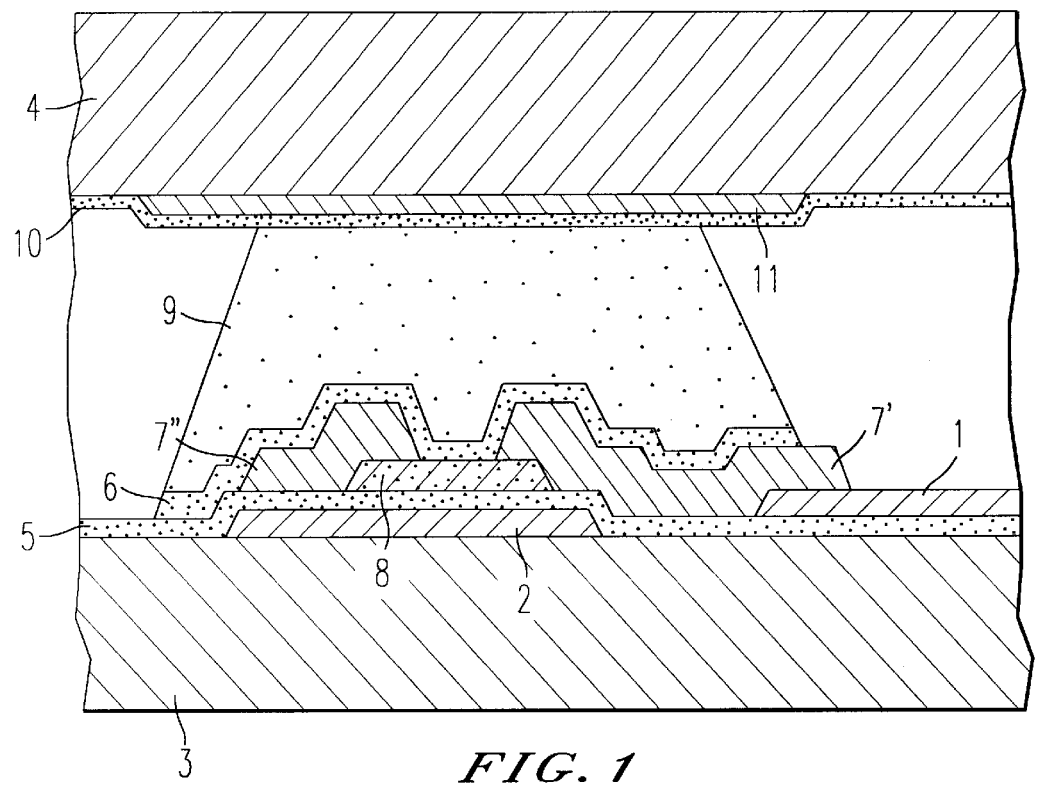
FIG. 1 represents a cross-section of a prior art pixel.

The prior art pixel represented in FIG. 1 consists of a substrate plate 3 and a back plate 4 which may be made of glass or any other material, depending on the display which may have three modes of operation: transmissive, reflective or transflective.

The gate 2 of the control transistor of the pixel, which corresponds to an address line, is deposited and etched on the plate 3. A film of insulator 5 and the semiconducting material 8 are deposited above this gate. The film 1 produces the electrode of the pixel in question and is connected to the source 7' of the control transistor of the pixel. The film 7" constitutes the drain of the transistor and corresponds to a column transmitting the image data. A passivation film 6 is deposited on the source 7', the semiconducting material 8 and the drain 7". The film 9 is deposited and etched so as to cover everything in order to insulate the elements of the photosensitive transistor and to fulfil its function of spacer between the plates 3 and the back plate 4 so that the liquid crystal is contained between these two plates in a volume whose height must be perfectly adjusted. There has optionally been deposited on this back-plate electrode a film 11 of opaque material (or black matrix) in order to protect the component and improve the contrast of the screen by masking its noncontrolled parts, and above it, the transparent back-plate electrode 10.

The materials used for the gate 2, the electrode 1, the source 7' and the drain 7" of the transistor, and the back-plate electrode 10 are conducting materials which may be of various types. Titanium, chromium, molybdenum, aluminium or tungsten are preferably used for the gate 2, the source 7' and the drain 7". It is also in certain cases possible to use a transparent conductor such as indium tin oxide (ITO) or tin oxide ($S_nO_2$). The back-plate electrode 10 and the electrode 1 of the pixel may consist of a transparent (ITO or $S_nO_2$) or opaque or reflecting conductor according to the mode of operation of the display (transmissive, reflective or transflective). The insulator films 5 and 6 are preferably produced from silicon oxide ($SiO_2$) or from silicon nitride (SiN) and the film 9 is preferably produced from a polyimide material often called the LBL (light blocking layer).

The various films have a thickness of the order of 200 to 3,000 Å for the film 2, 500 to 3,000 Å for the film 5, 300 to 3,000 Å for the film 1, 500 to 3,000 Å for the film 8, 500 to 5,000 Å for the films 7' and 7", 300 to 500 Å for the film 6, 3 to 6 microns for the film 9, 500 to 3,000 Å for the film 11 and 300 to 3,000 Å for the film 10.

The control component in question here is a thin film transistor (TFT) made of amorphous, monocrystalline or polycrystalline silicon, but it may also be a diode or metal-insulator-metal element.

The pixels are controlled in order to modify the polarisation of the light such as the helical nematic mode, the electrically controlled birefringence (BCF) or the ferroelectric mode, or in order to change the scattering or absorption of the light.

There is a stray capacitance between the gate 2 and the electrode 1 opposite each other; this stray planar capacitance has, for high definition screens (at least 100 lines per centimeters), a strong effect which distorts the voltage applied to the pixel of several volts, which is manifested by a flicker when the LCD is addressed in the conventional manner. This stray capacitance is also the cause of marking phenomena on the screen. There is also a stray planar capacitance between the drain 7" and the electrode 1 of the pixel. This stray capacitance distorts the voltage applied to the pixel and is manifested by a vertical crosstalk phenomenon.

Figure 2:
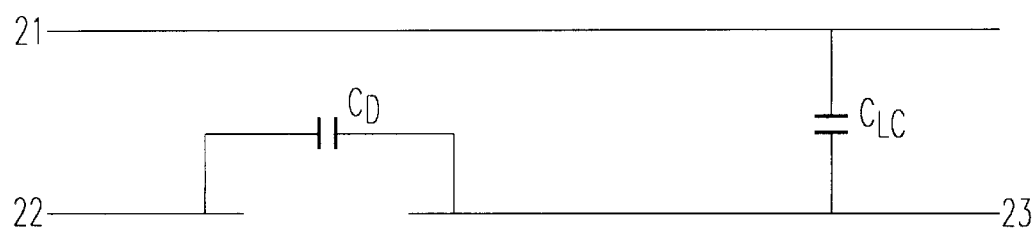
FIG. 2 represents its equivalent capacitive circuit diagram.

The equivalent capacitive circuit diagram is represented in FIG. 2 in which $C_{lc}$ is the capacitance of the liquid crystal contained between the electrodes 1 and 10 and $C_d$ the planar stray capacitance between the gate 2 and the electrode 1. The line 21 corresponds to the back-plate electrode 10, the line 22 to the gate and the line 23 to the electrode 1. If the coupling coefficient is denoted α, $$\alpha = C_d/C_{lc}$$

or, by way of example:

α=16% for $C_d$=2.4 ff and $C_{lc}$=15 ff (ff: fento Farad)

In the following figures, the control components in question are identical to this, and the preceding description is valid for the following figures and the common elements have kept the same numbering.

Figure 3:
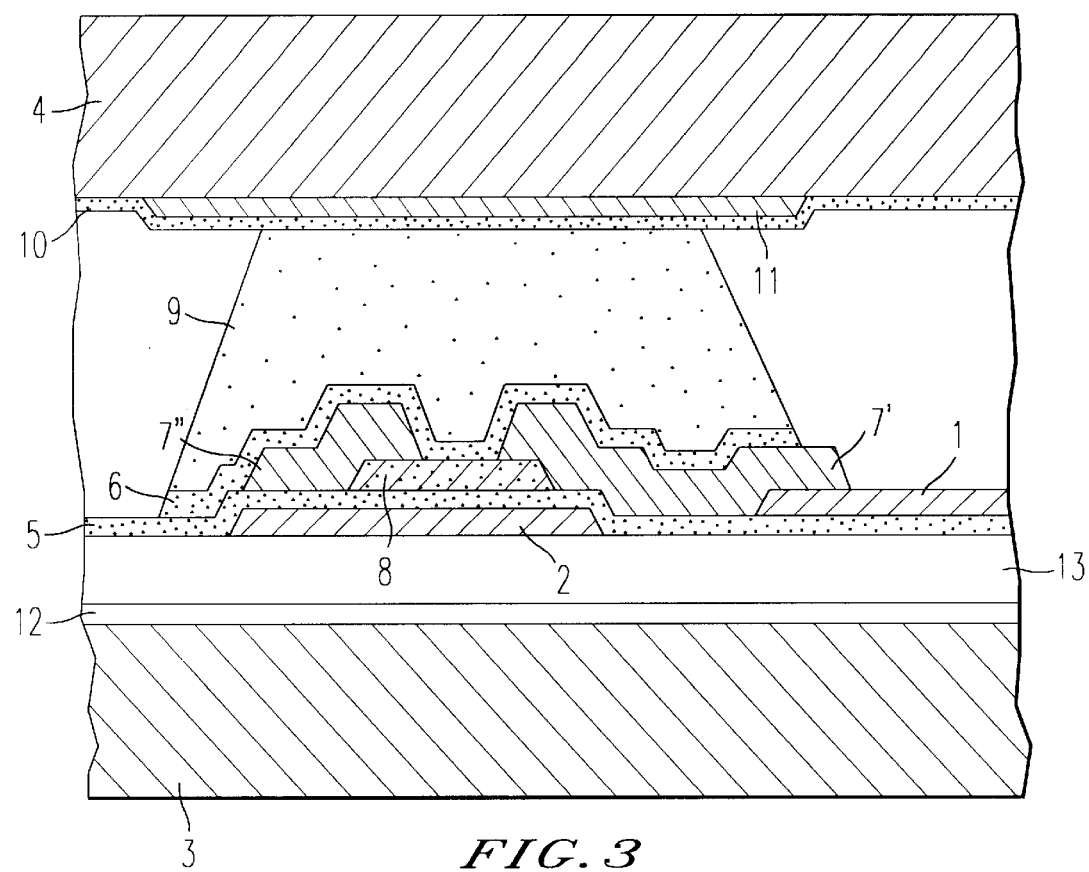
FIG. 3 represents a cross-section of a pixel according to a first embodiment of the invention.

FIG. 3 represents a cross-section of a screen according to a first embodiment of the invention. There has been added to the previously described structure, between the thin films and the plate 3, a conducting film 12 deposited directly onto the plate 3 producing the ground plane. A film 13 of insulator has been deposited onto this film 12 in order to insulate the ground plane 12 and produces the dielectric of the storage capacitance $C_S$ connected in parallel to the capacitance of the liquid crystal $C_{lc}$ via their common electrode 1. The capacitance of the pixel has thus been increased. Furthermore, the ground plane screens the field lines between the gate 2 and the electrode 1, and also between the drain 7" and the electrode 1. Both stray capacitances are therefore greatly diminished.

Figure 4:
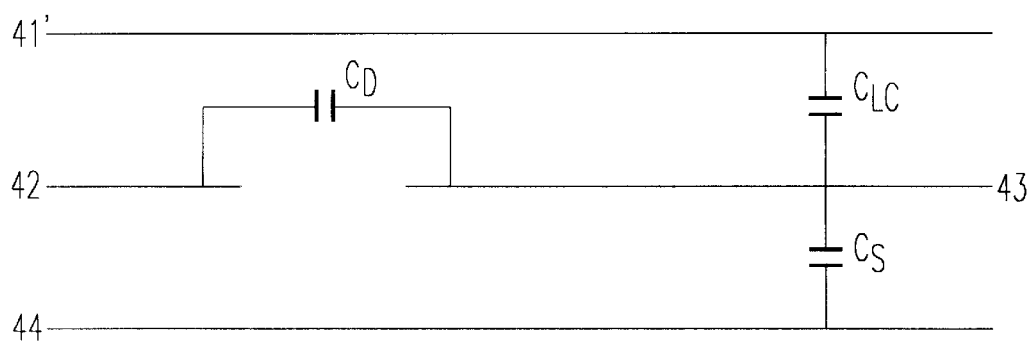
FIG. 4 represents its equivalent capacitive circuit diagram.

The equivalent capacitive circuit diagram is represented in FIG. 4 in which $C_d$ is the stray capacitance, $C_{lc}$ the capacitance of the liquid crystal and $C_S$ the storage capacitance whose electrodes are at the potential of the lines 44 and 43 corresponding respectively to the ground plane 12 and to the electrode 1 of the pixel. To return to the example cited hereinabove, for a storage capacitance $C_S$=58 ff, $C_d$ is then equal to 0.22 ff and the coupling coefficient α' is equal to 0.3%, which is a coupling coefficient 50 times smaller than that which exists in the case when there is no ground plane 12.

The ground plane 12 may be made of an opaque conducting material, typically titanium, chromium, molybdenum, aluminium or tungsten, or from a transparent conducting material, typically ITO or $S_nO_2$. Its thickness is of the order of 400 to 3,000 Å. The insulating film, for its part, may be produced from $S_iO_2$ or from $S_iN$ and its thickness (of the order of one micron) is chosen in order to obtain the desired storage capacitance.

In the case presented in FIG. 3, the ground plane 12 is deposited on the whole surface of the screen, but it may, in one different embodiment, cover only the noncontrolled parts of the screen or alternatively it may have any matrix shape such as being pierced with windows of any type of shape, since all its portions may be connected to a voltage source.

Figure 5:
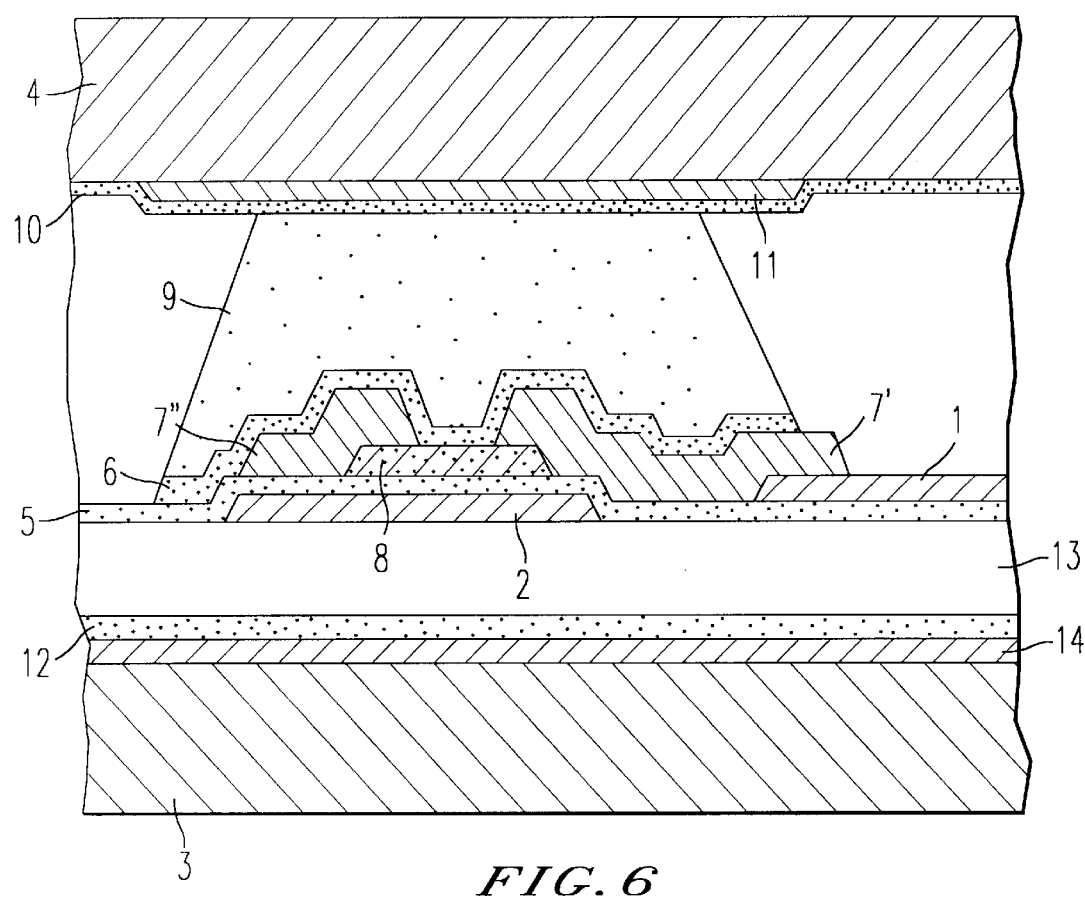
FIG. 5 represents a cross-section of a pixel according to a second embodiment of the invention.

An improvement may be made to the contrast of the screen by using an opaque mask called a Black Matrix constituted by an additional film deposited on the substrate plate and on which the control components and the connection lines are deposited in thin films. FIG. 5 thus represents a cross-section of a screen as described from FIGS. 3 and 4, but including an opaque mask 14 deposited directly onto the plate 3 and on which the ground plane 12 of the storage electrode $C_S$ is deposited. This mask may have various shapes, the only requirement being that it covers the noncontrolled parts of the screen. It may thus, as in FIG. 5, have the shape of a grid allowing only the active surface of the pixels to appear through its windows disposed in a matrix. The film 11 is in that case a matrix of distinct zones of round, square, octagonal, hexagonal or any other shape, covering only the control components and is optional.

Figure 6:
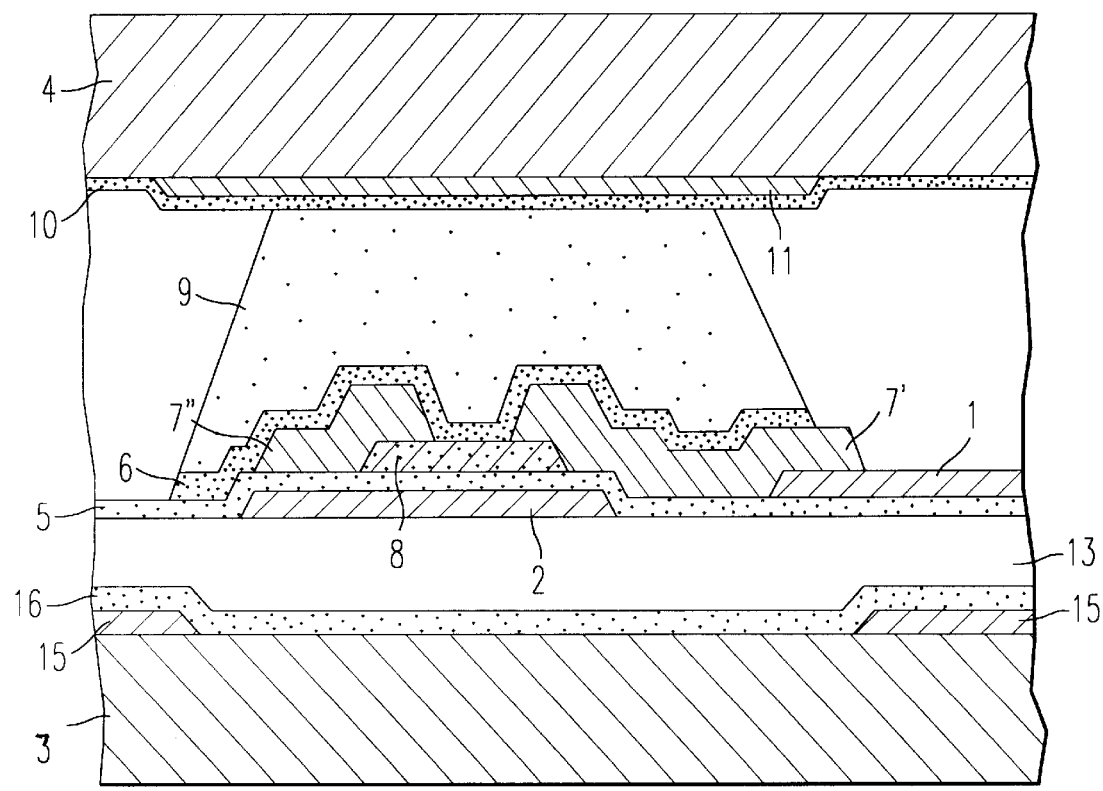
FIG. 6 represents a cross-section of a pixel according to a third embodiment of the invention.

This mask may also, as in FIG. 6, be formed of separate horizontal and vertical segments 15 of approximately rectangular shape deposited directly on the substrate plate 3 and such that they cover the noncontrolled parts situated between the control components, these being covered by the zones 11 as described in the previous paragraph. The ground plane 16 made of transparent conducting material is deposited and etched on the whole surface of the screen above these opaque segments 15.

In the cases of FIGS. 5 and 6, the films 14 and 15 producing the opaque mask may consist of an insulating or conducting opaque material. By using an insulating opaque material, it is possible to deposit the films 14 and 15 respectively between the films 2 and 13 and 5 and 16.

In FIGS. 5 and 6, the respective positions of the films 12 and 14 and 16 and 15 respectively constituting the transparent ground planes and the opaque masks may be transposed without departing from the scope of the invention.

Figure 7:
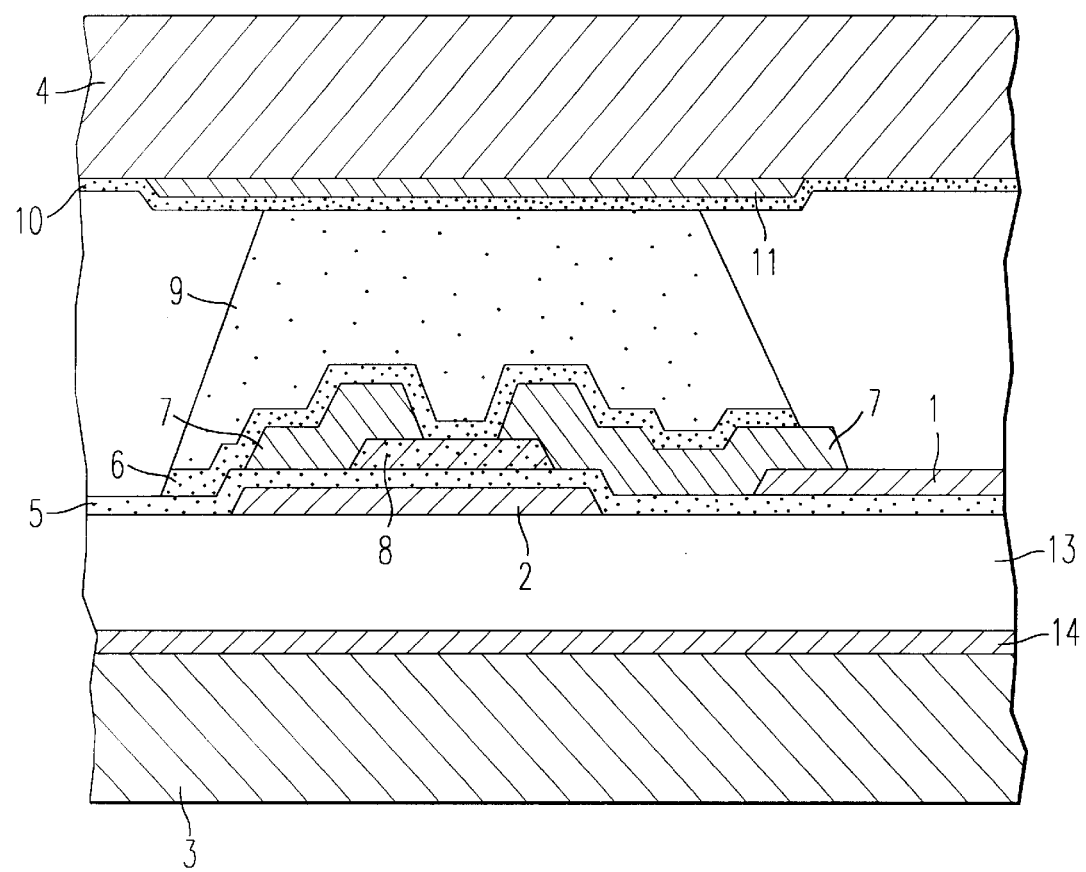
FIG. 7 represents a cross-section of a pixel according to a fourth embodiment of the invention.

An important advantage of the use of an opaque mask made of a conducting material is that it is then possible to use it as the ground plane, this makes it possible to eliminate a step in the manufacturing process. Thus, FIG. 7 presents this opaque mask 14 used as the ground plane. This may then only have the shape of a grid as described from FIG. 5 since it must form an equipotential. It consists of an opaque film 14 pierced with windows allowing the active surfaces of the pixels to appear, but covering the noncontrolled surfaces. It thus screens the field lines of the planar stray capacitance diminishing its value whilst adding a small storage capacitance.

Figure 8:
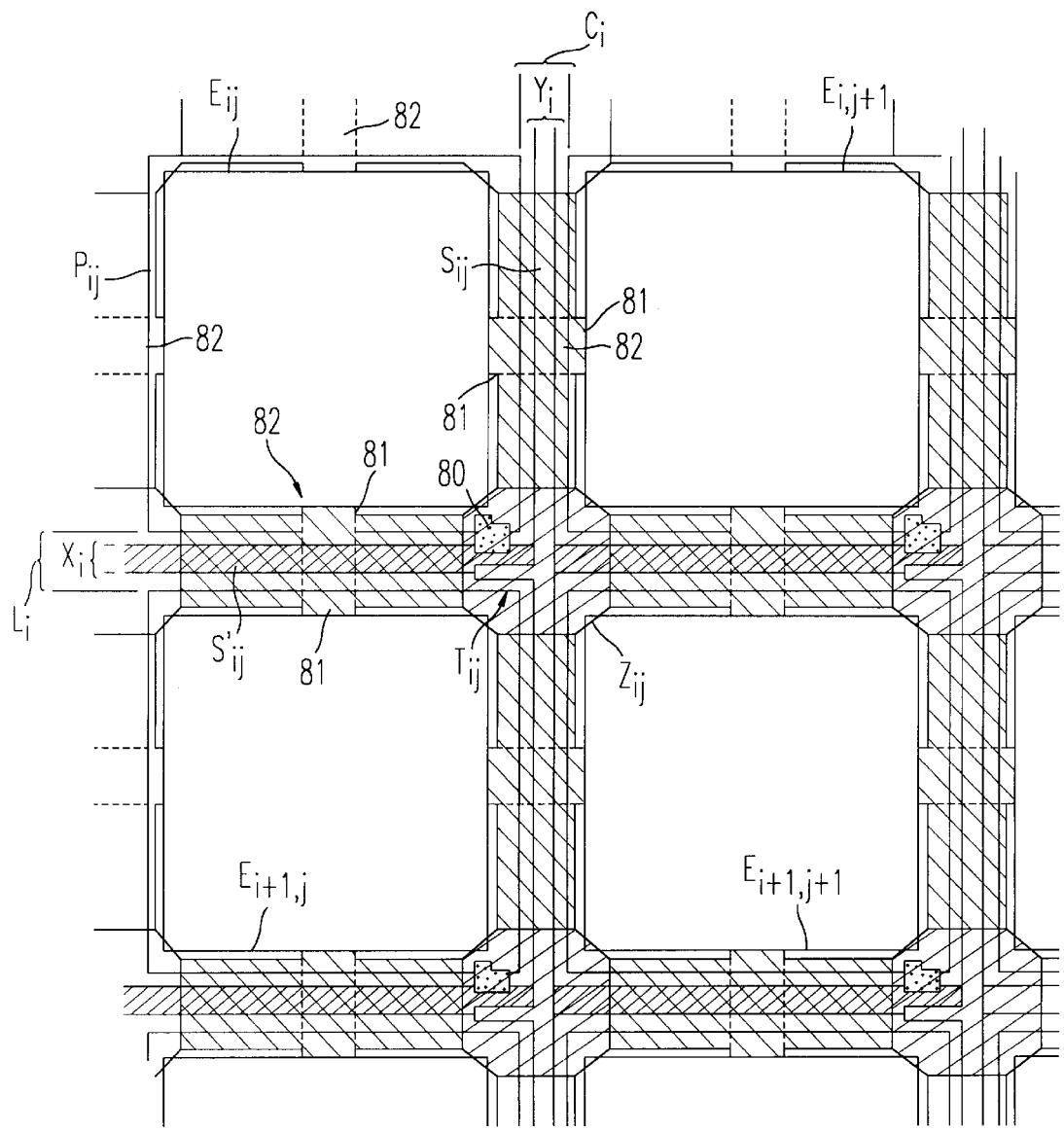
FIG. 8 represents a top view of a liquid crystal screen according to a particular case of producing the third embodiment.

FIG. 8 represents a pair of the matrix lattice including the electrodes, the components controlling them and the connections, as well as a ground plane according to one particular case of one embodiment of the invention as described hereinabove from FIG. 6.

In order not to burden the description, we will only consider a single pixel labelled ij, it being the case of course that the same description applies to all the other pixels.

A pixel consists of an electrode Pij which is separated from the neighbouring electrodes by the noncontrolled surfaces Li and Cj carrying the line Xi (corresponding to the film 2) and the column Yj (corresponding to the film 7") for connecting the control component Tij situated at the intersection of these noncontrolled surfaces Li and Cj. This component Tij controls the electrode Pij corresponding to the film 1 of the pixel via a connection member 80 (corresponding to the film 7').

The component considered here is a thin film transistor (TFT) but it may be of the type with two terminations like diodes or metal-insulator-metal elements without departing from the scope of the invention. The ground plane considered here is a superposition of two films in contact: a ground plane made of a transparent material increasing the capacitance of the pixel and a conducting opaque mask screening the field lines of the planar stray capacitances. The opaque mask is deposited directly onto the substrate plate and consists of separate vertical Sij and horizontal S'ij segments having a rectangular shape and which are fitted with two lateral tabs 81 extending slightly beyond the active surface of the pixel. These segments Sij and S'ij cover the noncontrolled surfaces Li and Cj of the screen which are situated between the control components. These segments may also be connected together, covering the control components and thus forming a grid as described from FIG. 5. Opaque zones Zij corresponding to the films 11 of the preceding figures, of round, square, octagonal, hexagonal or any other shape, are deposited on the back plate and cover the control components Tij. The transparent ground plane is deposited directly onto the opaque mask and includes a matrix arrangement of electrodes Eij connected together and covering a large area of the active surface of each of the pixels. Each of the electrodes is fitted with four tabs 82, shown in dotted lines in FIG. 8, connected to the four electrodes Ei+1,j Ei,j−1, Ei-i,j Eij+1 facing its four edges. These tabs 82 cover the lateral tabs 81 of the segments Sij and S'ij of the opaque mask.

The respective positions of the two films constituting the ground plane and the opaque mask may be transposed without departing from the scope of the invention. However, an additional advantage of this structure appears when the conducting opaque mask is deposited beneath the conducting and transparent ground plane, that is to say when it is deposited directly onto the substrate plate. In fact, a transparent conductor cannot be cut out with a laser but the opaque material used for the mask may be cut out and, when evaporating, will take the transparent conductor with it and thus make a cutout in the ground plane. These cutouts made with a laser are used to correct defects in the thin films of the screen. For example, since the insulator is not necessarily reliable, it may be the case that the conducting and transparent ground plane comes into contact with a column or a line and it is then necessary to insulate this defective part from the rest of the screen. The quality of one pixel is lost, but a column or a line is saved.

The ground plane consists of a transparent conducting material such as for example ITO or $S_nO_2$ and has a thickness of the order of 400 to 3,000 Å. The opaque mask consists of an opaque conducting material such as, for example, titanium, chromium, molybdenum, aluminium or tungsten and has a thickness of the order of 500 to 3,000 Å.

In all the previous examples, the surface of the ground plane extends sufficiently beyond that of the screen in order for it to be possible to dispose therein a frame consisting of one or more films of one or more materials having a resistance per square less than that of the material used for the ground plane, this being in order to diminish the response time of the storage capacitance, that is to say the time which is necessary for the ground plane to return to being an equipotential after a local variation of the charge.

In the case of an ITO ground plane, the frame may be made of titanium and may have a width of the order of 50 to 200 μm and a thickness of the order of 500 to 2,000 Å.

The present invention may be utilised in any liquid crystal display and, in particular, in high definition liquid crystal screens.

We claim:

1. Active matrix display screen including a substrate plate on one face of which there are deposited electrodes and thin film components controlling these electrodes, and a back plate including one or more back-plate electrodes and covering said face of the substrate plate, a liquid crystal being contained between the electrodes of the plate and the back-plate electrode, or electrodes of the back plate including a ground plane forming an equipotential over the whole surface of the screen between the substrate plate and the thin films of the control components, wherein the ground plane consists of two films superimposed one above the other, one layer being conducting and transparent and the other being opaque, with openings realized at least in the opaque layer.

2. Active matrix display screen according to claim 1, characterized in that the ground plane includes an opaque conducting material selected from the group consisting of titanium, chromium or molybdenum, aluminum or tungsten.

3. Active matrix display screen according to claim 1, characterised in that the opaque film completely covers the noncontrolled surfaces of the screen.

4. Active matrix display screen according to claim 1, characterized in that it includes zones which are made of an opaque material, have a round, hexagonal, octagonal or any other shape and are deposited onto the back plate in such a way that their surfaces completely mask the control components which are parts of the noncontrolled surface of the screen, in order to improve the contrast of the screen.

5. Active matrix display screen according to claim 1, characterised in that the ground plane constituting the electrode of a storage capacitance is surrounded on its rims by a ring made from a material having a resistance per square less than that of the ground plane.

6. Active matrix display screen according to claim 5, characterised in that the ring consists of a stack of different materials having a resistance per square less than that of the ground plane.

7. Active matrix display screen according to claim 1, characterized in that the opaque film covers at least some parts of the non-controlled surfaces of the screen.

8. Active matrix display screen according to claim 1, characterized in that the opaque film consists of segments entirely covering only the uncontrolled surfaces situated between the control components.

9. Active matrix display screen connected to claim 8, characterised in that the ground plane includes a transparent film which consists of a matrix arrangement of electrodes, each completely or partially covering an active surface of each pixel and being fitted with four tabs connected to the four electrodes opposite its four edges.

10. Active matrix display screen according to claim 9, characterised in that the segments of the opaque film are fitted with two lateral tabs extending slightly beyond the active surface of the pixel and covering the tabs of the electrodes of the transparent film of the ground plane.

11. Active matrix display screen according to claim 1, characterized in that the ground plane covers only non-controlled surfaces of the screen.

* * * * *